United States Patent
Hoppe

(10) Patent No.: US 6,402,443 B1
(45) Date of Patent: Jun. 11, 2002

(54) MACHINING UNIT ON A MACHINE TOOL

(75) Inventor: Gerd Hoppe, Habichtswald (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 09/644,887

(22) Filed: Aug. 23, 2000

(30) Foreign Application Priority Data

Aug. 26, 1999 (DE) ......................................... 299 14 930

(51) Int. Cl.[7] ................................................. B23C 1/00
(52) U.S. Cl. ..................... 409/230; 408/56; 409/144; 409/136
(58) Field of Search ................................ 409/135, 136, 409/144, 230, 231, 233; 408/56

(56) References Cited

U.S. PATENT DOCUMENTS

| | | | | |
|---|---|---|---|---|
| 4,077,736 A | * | 3/1978 | Hutchens | 408/16 |
| 4,614,470 A | * | 9/1986 | Mitsuharu et al. | 409/230 |
| 4,992,012 A | * | 2/1991 | Cioci | 409/136 |
| 5,636,949 A | * | 6/1997 | Nakamura et al. | 409/230 |
| 5,697,739 A | * | 12/1997 | Lewis et al. | 409/230 |
| 5,878,476 A | * | 3/1999 | Noelle et al. | 409/230 |

FOREIGN PATENT DOCUMENTS

| | | |
|---|---|---|
| DE | 32 43 112 | 7/1983 |
| DE | 42 11 348 | 10/1993 |
| DE | 44 15 306 | 11/1995 |
| DE | 196 15 382 | 10/1997 |

\* cited by examiner

*Primary Examiner*—Daniel W. Howell
(74) *Attorney, Agent, or Firm*—The Maxham Firm

(57) ABSTRACT

A machining unit on a machine tool, especially a universal milling and drilling machine, comprising a motor-driven work spindle rotatably mounted in a casing of a spindle head, an adapter unit comprising a motor-driven adapter spindle and insertable into the work spindle, a first connecting part disposed on the spindle head and containing plug-in connections connected by lines to supplies of working media and a second connecting part disposed on the adapter unit, and containing mating plugs which can be coupled to the plug-in connections for releasably connecting the adapter unit to the working-media supply. A clamping device for releasably holding the plug-in connections and mating connections in the coupled position is disposed on at least one of the two connecting parts, thus providing a secure connection between the plug-in connections disposed in the spindle casing and the mating connections disposed on the adapter unit.

21 Claims, 4 Drawing Sheets

MACHINING UNIT ON A MACHINE TOOL

BACKGROUND OF THE INVENTION

1. Field of the Invention

The invention relates to a machining unit on a machine tool, especially a universal milling and drilling machine, an adapter unit insertable into the machine work spindle with plug-in connections connected by lines to supplies of working media and mating plugs for releasably connecting the adapter unit to the working-media supplies.

2. Discussion of the Related Art

For the purpose of high-speed machining with spindles rotating, for example, at 30,000 rpm or more, even on conventional milling and drilling machines, there are known separate adapter units comprising a rapidly rotating additional spindle which can be inserted in the normal spindles of milling and drilling machines when needed. The adapter units can be supplied with working media such as coolants, lubricants, hydraulic fluid, compressed air or the like via a conventional plug connector which can be coupled between the adapter unit and the spindle casing. These plug-in units, however, must remain firmly connected even under the loads occurring during machining, so as to avoid disturbances in operation caused by leaks or undesired breaks in the line.

SUMMARY OF THE INVENTION

A primary purpose of the invention is to provide a machining unit of the type identified above for securely connecting the plug connections on the spindle casing to the mating connections on the adapter unit. To this end, according to the invention, a clamping device for releasably holding the plug-in connections and mating connections in the coupled position is disposed on at least one of the two connecting parts.

By means of the preferred embodiment of the invention, the plug-in connections for connecting the adapter unit to a supply of working medium, which can be automatically coupled together when an adapter unit is inserted in the working spindle of a machine tool, can remain securely interconnected even during the machining operation. This ensures that the adapter unit receives a reliable, interference-free supply, for example, of coolant for cooling an additional drive, hydraulic fluid for actuating clamping devices, compressed air for cleaning clamping cones on an additional spindle, cooling lubricants for supplying to the machining station and the like.

In a particularly advantageous embodiment, for example, the clamping device can, for example, be a clamping unit disposed on the first connecting part for releasably holding a tightening pin disposed on the second connecting part. The clamping unit can be constructed like an automatic tool tension jack incorporated in the working spindle, by means of which a clamping cone disposed on the adapter unit is clamped in the working spindle. By this means, for example, the hydraulic actuating means of the clamping unit for releasing the connecting parts can be coordinated in simple manner with a corresponding actuating means of the tool tightening jack for releasing the clamping cone, thus simplifying the control system.

In another advantageous embodiment a groove is disposed on one of the two connecting parts for engagement, sealed by a sealing ring, of a web provided on the other connecting part. By this means, when the two connecting parts are connected by the clamping device, the plug connector can be protected from being soiled by machining residues or cooling lubricant accumulating during the machining operation.

BRIEF DESCRIPTION OF THE DRAWING

The objects, features and advantages of the invention will be more clearly perceived from the following-detailed description when read in conjunction with the accompanying drawing, in which.

DETAILED DESCRIPTION OF THE PREFERRED EMBODIMENTS

Figure 1:
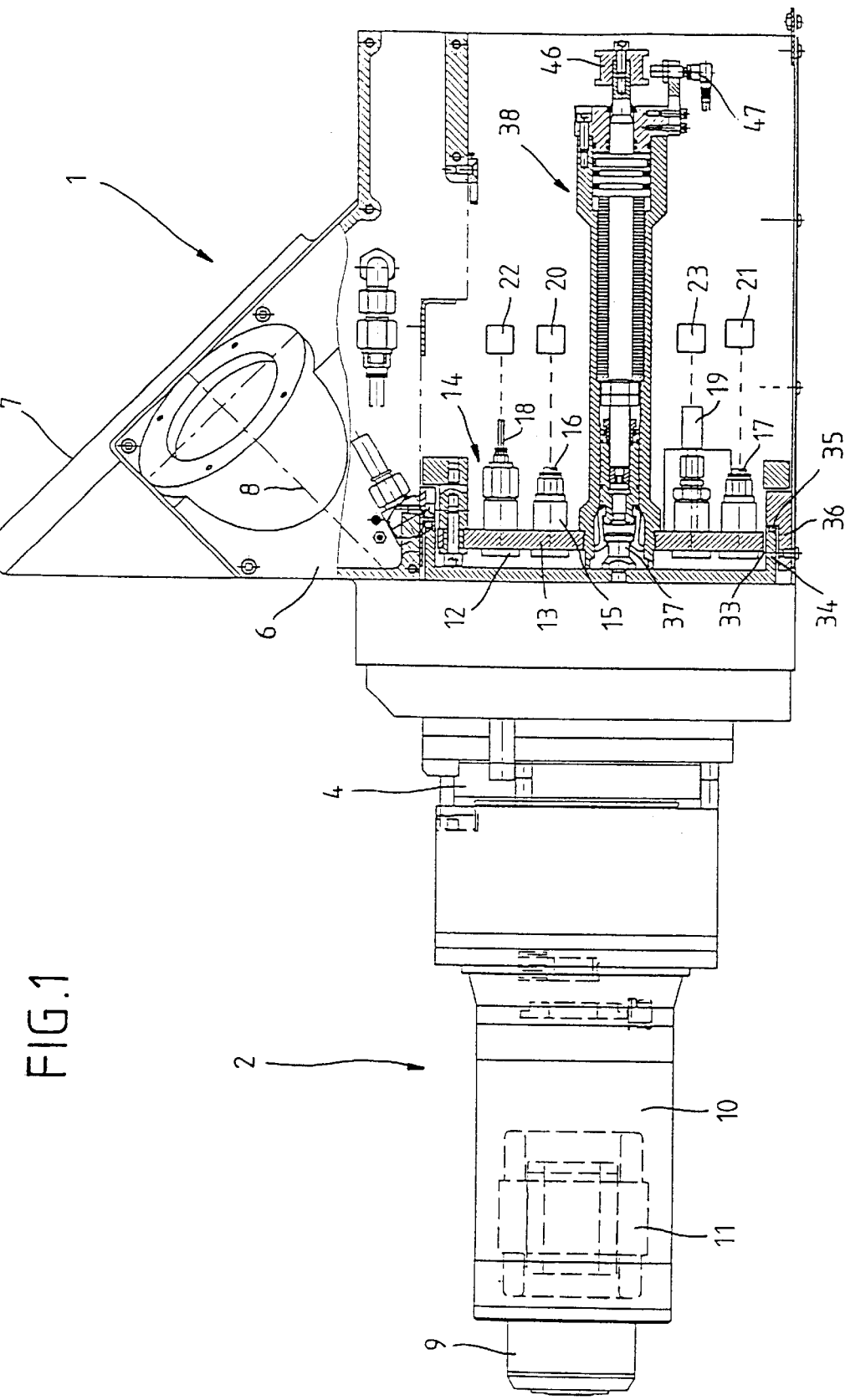
FIG. 1 is a side view, partially in section, of a pivotable milling head of a universal milling and drilling machine with an adapter unit in accordance with the invention.

FIG. 1 is a diagram of a machining unit on a universal milling and drilling machine comprising milling head 1 and interchangeable adapter unit 2 inserted into working spindle 4 on the milling head via clamping cone 3 (shown in chain lines in FIG. 2) and also used in conventional tool holders. Adapter unit 2 can be fastened to milling head 1 by conventional automatic tool tension jacks, wherein, for example, tightening bolt 5 disposed on clamping cone 3 is held by the collet chuck of an automatic high-speed clamping device incorporated in working spindle 4. The working spindle is rotatably mounted in spindle casing 6 in the milling head and is driven by a motor (not shown). Spindle casing 6 comprises bearing surface 7 inclined at 45°, by means of which the milling head is rotatable around 45° axis 8 on a front wall, likewise inclined at 45°, of a bearing element (not shown) of the universal milling and drilling machine. By suitably rotating milling head 1 around axis 8, working spindle 4 can be pivoted between a vertical machining position and a horizontal machining position as shown in FIG. 1. Adapter unit 2, insertable when required into working spindle 4, contains adapter spindle 9 designed for high speeds of rotation and mounted rotatably in casing 10 and driven in rotation by motor 11, indicated by chain lines. Adapter spindle 9 has a smaller diameter than working spindle 4 and is designed for smaller tool to holders.

Figure 3:
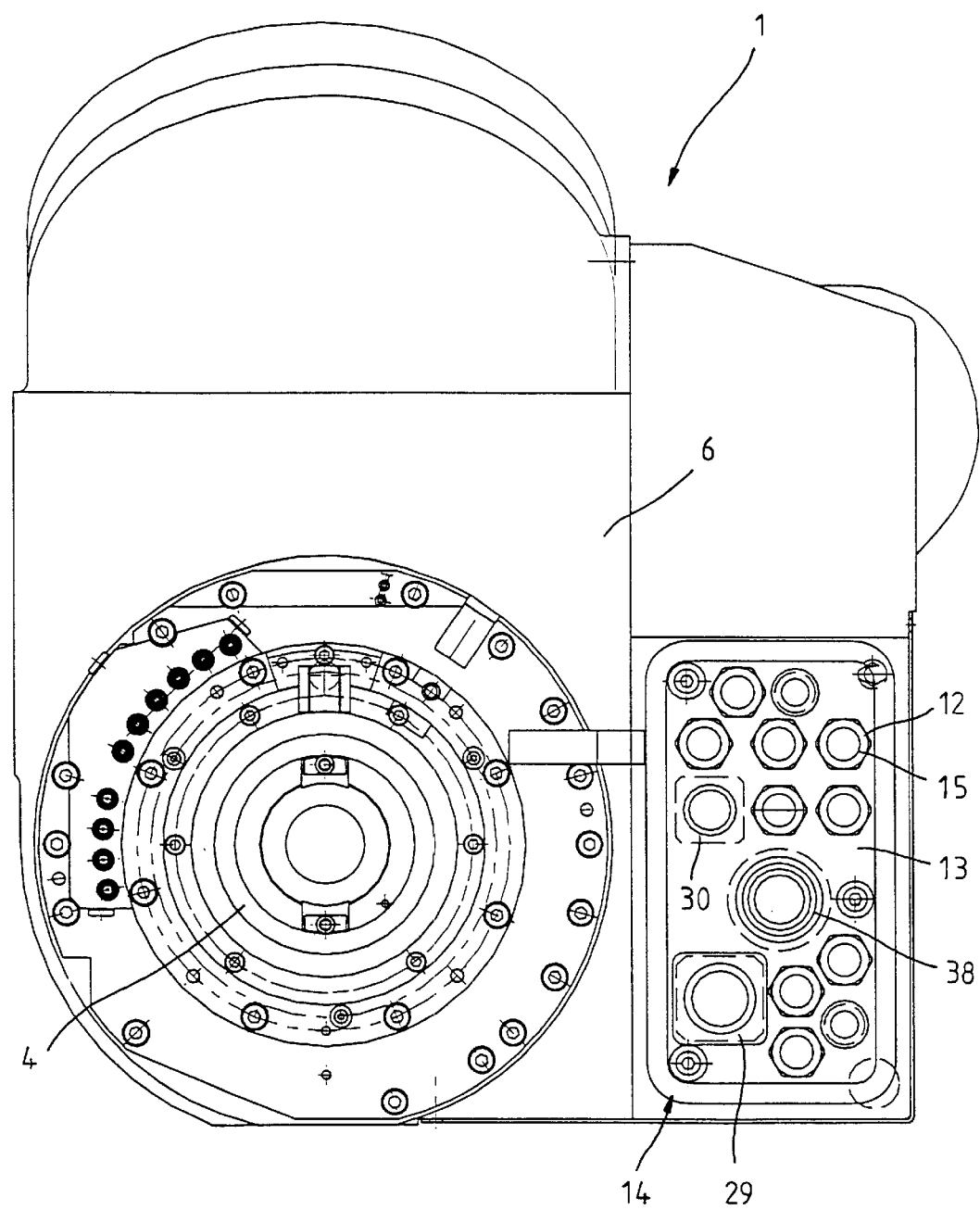
FIG. 3 is a front view of the working spindle and the plug-in connections of the invention shown in FIG. 1.

As shown particularly in FIGS. 1 and 3, first connecting part 14 laterally offset from working spindle 4 is disposed on spindle casing 6 and contains plug-in connections 15 fastened by hexagonal nuts 12 to substantially rectangular connecting plate 13. Plug-in connections 15, in the form of bushes, are connected as shown in FIG. 1 via outward and return lines 16, 17 or supply lines 18, 19 to diagrammatically indicated supply units 20–23 for supplying adapter unit 2 with working media such as hydraulic fluid, compressed air, lubricants, coolants or the like. Several connections 15 are shown but only one is identified by a lead line and reference numeral.

Figure 2:
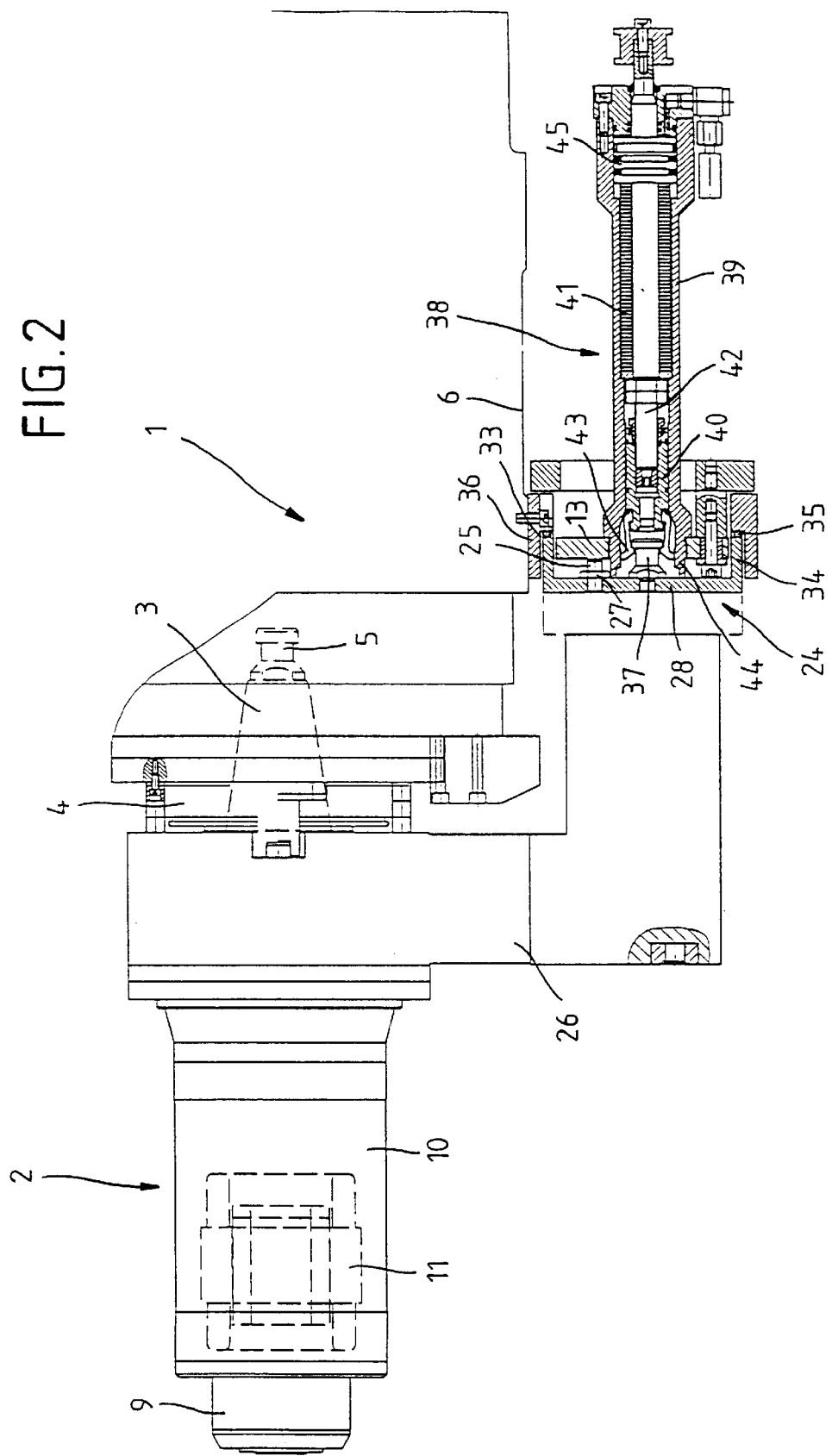
FIG. 2 is a plan view, partially in section, of the milling head and adapter unit of FIG. 1.
Figure 4:
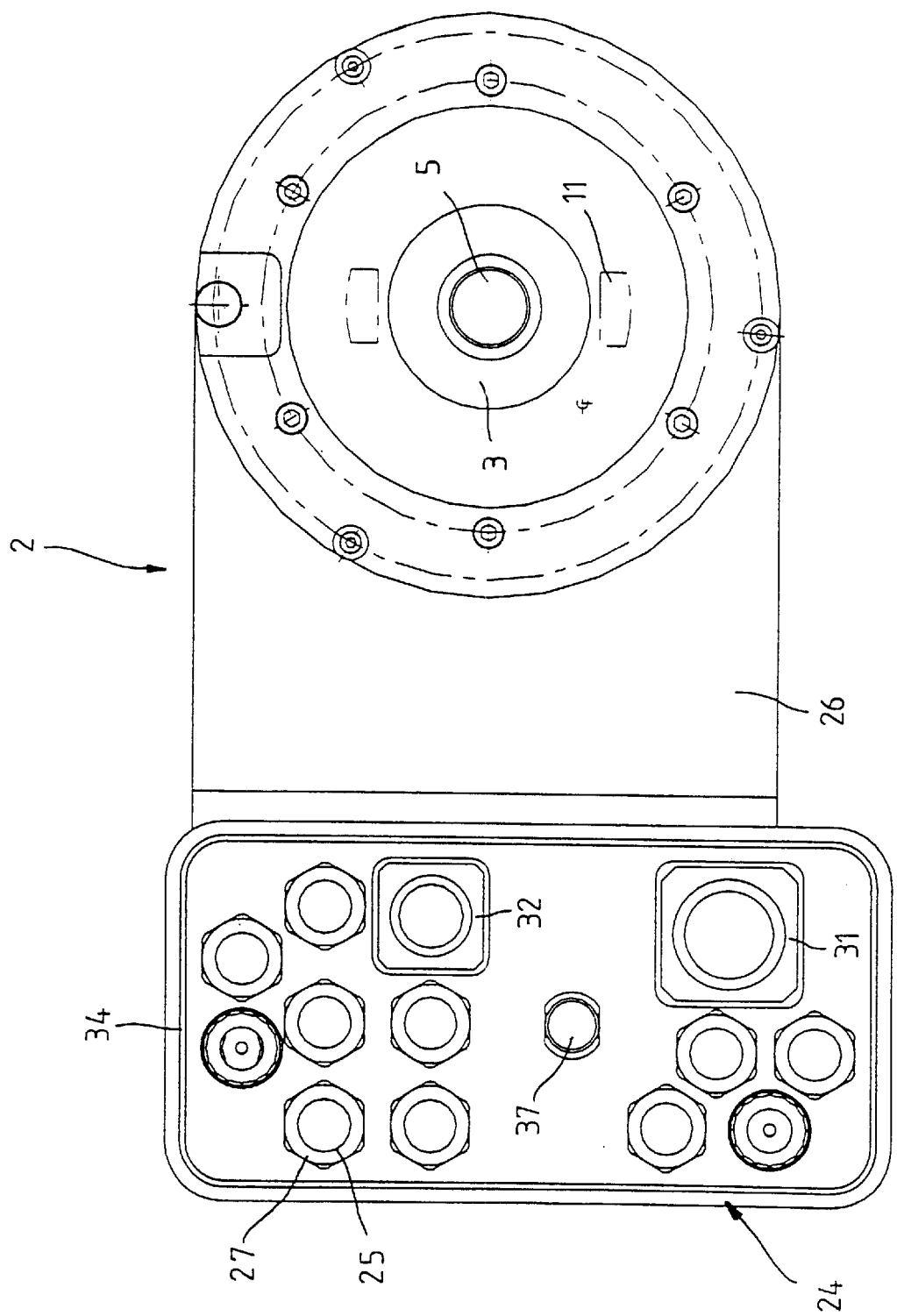
FIG. 4 is a back view of the adapter unit of the invention shown in FIG. 1 with the mating connections complementary with the plug-in connections.

As shown in FIGS. 2 and 4, casing 10 of adapter unit 2 has lateral attachment 26 bearing second connecting part 24 offset parallel to clamping cone 3 for connecting to first connecting part 14 disposed on spindle casing 6. Mating connections 25 for coupling to plug-in connections 15 are disposed on second connecting part 24 for connecting adapter unit 2 to fluid lines 16–19 connected to supply units 20–23 in FIG. 1. Mating connections 25 are in the form of tubular plugs which are fastened to rectangular end plate 28 of the second connecting part 24 for engagement in corresponding bushes 15 via hexagonal nuts 27. Bushes 15 and plugs 25 for coupling and connecting to the fluid lines are known per se. They have automatically actuated non-return valves which release the flow in the coupled position and cut it off when disconnected. The non-return valves are designed to provide a fault-free seal in the uncoupled state. In addition to the plug-in connections for the fluid lines, electric plug connections comprising plugs 29, 30 (FIG. 3) and complementary mating plugs 31, 32 (FIG. 4) are provided on the two connecting parts 15, 25 so as, for example, to supply motor 11 with electricity or transmit signals between monitoring sensors in adapter unit 2 and a control device on the machine tool.

As seen in FIG. 1, peripheral groove 33 is formed between front casing part 36 of first connecting part 14 and connecting plate 13 thereof. Web 34 disposed at the end of second connecting part 24 engages the groove, sealed by sealing ring 35, when adapter unit 2 in FIG. 1 is disposed on milling head 1. This prevents the plug-in connections from being soiled by cooling lubricants and machining residues accumulating during the machining operation.

In order to firmly hold plug-in connections 15 and mating connections 25 in the coupled position and also in order to sealingly connect the two connecting parts 15 and 25, clamping unit 38 (FIGS. 1 and 2) is fastened to connecting plate 13 of first connecting part 14 for releasably holding tightening pin 37 disposed on the end plate of the second connecting part. Clamping unit 38, as shown in FIG. 2, comprises spring collet 40 movable in hollow cylindrical casing 39 and fastened to the front end of tension rod 42 prestressed by cup spring assembly 41. Laterally pivotable grippers 43 are disposed at the front end of spring collet 40 and in the clamped position are pressed inwardly by projection 44 on the inner wall of casing 39 for engaging the tightening pin. Piston 45 is disposed at the rear end of tension rod 42 for pressing it forwardly against the force of cup spring assembly 41. Grippers 43 are pressed outwardly and release tightening pin 37. Monitoring element 46 is disposed at the rear end of tension rod 42 and co-operates with contactless sensor 47 for monitoring the clamped and released position of clamping unit 38.

The clamping unit provides a secure connection between the plug connectors for the supply of working medium when an interchangeable adapter unit is inserted into the working spindle of a spindle head. The clamping unit for releasably holding the two connecting parts can be constructed like the tool tension jack for fixing tightening cones in the tightening spindle. Other tightening devices can also be used, however.

What is claimed is:

1. A machining unit on a machine tool, especially a universal milling and drilling machine, having a spindle head and a spindle casing comprising:

a motor-driven work spindle rotatably mounted in said casing of said spindle head;

an adapter unit comprising a motor-driven adapter spindle and insertable into said work spindle;

means for supplying at least one working medium;

a first connecting part disposed on said spindle head and having at least one plug-in connection connected by a line to said means for supplying working medium;

a second connecting part disposed on said adapter unit and having mating plugs shaped and configured to be coupled to said plug-in connection for releasably connecting said adapter unit to said working medium supply means; and a clamping device for releasably holding said plug-in connection and said mating connection in the coupled position, said clamping device being disposed on at least one of said first and second connecting parts.

2. The machining unit according to claim 1, wherein said clamping device has a clamping unit and a tightening pin, said clamping unit being disposed on said first connecting part for releasably holding said tightening pin disposed on said second connecting part.

3. The machining unit according to claim 2, wherein said clamping unit has a casing, a tension rod in said casing, a spring collet movable by said tension rod, and laterally pivotable grippers for engaging said tightening pin.

4. The machining unit according to claim 3, and further comprising a piston disposed on said tension rod and a cup spring assembly engaging said tension rod, wherein said grippers are moved into a clamping position by said cup spring assembly and are movable into a released position by said piston.

5. The machining unit according to claim 3, and further comprising a monitoring element disposed at the rear end of said tension rod, and a contactless sensor with which said monitoring element co-operates, said clamping unit having a clamped position and a released position, said monitoring element monitoring the position of said clamping unit.

6. The maching unit according to claim 4, and further comprising a monitoring element disposed at the rear end of said tension rod, and a contactless sensor with which said monitoring element co-operates, said clamping unit having a clamped position and a released position, said monitoring element monitoring the position of said clamping unit.

7. The machining unit according to claim 2, wherein said first connecting part has a connecting plate with a central bore, said clamping unit being disposed in said central bore on said connecting plate.

8. The machining unit according to claim 3, wherein said first connecting part has a connecting plate with a central bore, said clamping unit being disposed in said central bore on said connecting plate.

9. The machining unit according to claim 4, wherein said first connecting part has a connecting plate with a central bore, said clamping unit being disposed in said central bore on said connecting plate.

10. The machining unit according to claim 5, wherein said first connecting part has a connecting plate with a central bore, said clamping unit being disposed in said central bore on said connecting plate.

11. The machining unit according to claim 1, wherein:

a groove is disposed on one of said first and second connecting parts and a web is provided on the other of said first and second connecting parts;

said machining unit further comprising a sealing ring which seals said web and said groove when said first and second connecting parts are engaged.

12. The machining unit according to claim 2, wherein:

a groove is disposed on one of said first and second connecting parts and a web is provided on the other of said first and second connecting parts;

said machining unit further comprising a sealing ring which seals said web and said groove when said first and second connecting parts are engaged.

13. The machining unit according to claim 3, wherein:

a groove is disposed on one of said first and second connecting parts and a web is provided on the other of said first and second connecting parts;

said machining unit further comprising a sealing ring which seals said web and said groove when said first and second connecting parts are engaged.

14. The machining unit according to claim 4, wherein:

a groove is disposed on one of said first and second connecting parts and a web is provided on the other of said first and second connecting parts;

said machining unit further comprising a sealing ring which seals said web and said groove when said first and second connecting parts are engaged.

15. The machining unit according to claim 5, wherein:

a groove is disposed on one of said first and second connecting parts and a web is provided on the other of said first and second connecting parts;

said machining unit further comprising a sealing ring which seals said web and said groove when said first and second connecting parts are engaged.

16. The machining unit according to claim 7, wherein:

a groove is disposed on one of said first and second connecting parts and a web is provided on the other of said first and second connecting parts;

said machining unit further comprising a sealing ring which seals said web and said groove when said first and second connecting parts are engaged.

17. The machining unit according to claim 1, and further comprising electrical plugs and mating plugs disposed on said first and second connecting parts for transmitting signals between said milling head and said adapter unit.

18. The machining unit according to claim 2, and further comprising electrical plugs and mating plugs disposed on said first and second connecting parts for transmitting signals between said milling head and said adapter unit.

19. The machining unit according to claim 3, and further comprising electrical plugs and mating plugs disposed on said first and second connecting parts for transmitting signals between said milling head and said adapter unit.

20. The machining unit according to claim 4, and further comprising electrical plugs and mating plugs disposed on said first and second connecting parts for transmitting signals between said milling head and said adapter unit.

21. The machining unit according to claim 5, and further comprising electrical plugs and mating plugs disposed on said first and second connecting parts for transmitting signals between said milling head and said adapter unit.

* * * * *